(12) United States Patent
Choi

(10) Patent No.: US 8,851,766 B2
(45) Date of Patent: Oct. 7, 2014

(54) FIBER OPTIC MECHANICAL SPLICER

(75) Inventor: An Joon Choi, Seoul (KR)

(73) Assignee: A.J. World Co. Ltd., Seoul (KR)

( * ) Notice: Subject to any disclaimer, the term of this patent is extended or adjusted under 35 U.S.C. 154(b) by 86 days.

(21) Appl. No.: 13/642,036

(22) PCT Filed: Nov. 29, 2011

(86) PCT No.: PCT/KR2011/009148
§ 371 (c)(1),
(2), (4) Date: Oct. 18, 2012

(87) PCT Pub. No.: WO2013/081205
PCT Pub. Date: Jun. 6, 2013

(65) Prior Publication Data
US 2013/0202257 A1    Aug. 8, 2013

(51) Int. Cl.
*G02B 6/255*    (2006.01)
*G02B 6/38*    (2006.01)
*G02B 6/25*    (2006.01)

(52) U.S. Cl.
CPC ............... *G02B 6/2555* (2013.01); *G02B 6/25* (2013.01); *G02B 6/3806* (2013.01)
USPC .................................. 385/99; 385/95; 385/97

(58) Field of Classification Search
CPC .................................................... G02B 6/2557
USPC ..................................................... 385/97, 99
See application file for complete search history.

(56) References Cited

U.S. PATENT DOCUMENTS 5,963,699 A * 10/1999 Tanaka et al. .................... 385/97
6,343,879 B1    2/2002 Lesueur et al. .................. 385/99

FOREIGN PATENT DOCUMENTS

JP    2010-266600    11/2010    ............... G02B 6/24
KR    1020110037341    4/2011    ............... G02B 6/38

OTHER PUBLICATIONS

Authorized Officer: Kang Sung Chul, International Search Report, PCT/KR2011/009148, 3 pages, Jul. 31, 2012.

* cited by examiner

*Primary Examiner* — Ryan Lepisto
(74) *Attorney, Agent, or Firm* — Sunstein Kann Murphy & Timbers LLP

(57) ABSTRACT

A fiber optic mechanical splicer includes a fiber connection base, a base cover and one or more fastening clamps. The base includes a plurality of insertion parts, fiber connection parts, and auxiliary protuberances. Each of the insertion parts having an insertion hole through which an optical cable is inserted. A connection groove is formed at a central portion of the fiber connection parts and extends in a lengthwise direction of the fiber connection parts. The base cover covers the fiber connection parts and is supported by the auxiliary protuberances. The one or more fastening clamps elastically fit around the fiber connection base and the base cover to fixedly hold the fiber connection base and the base cover with each other while pressing the optical fiber seated in the connection groove.

3 Claims, 5 Drawing Sheets

(a)            (b)

(a) AXIAL DISACCORD
(b) ANGULAR DISACCORD
(c) OCCURRENCE OF A GAP
(d) ROUGH END SURFACE

FIBER OPTIC MECHANICAL SPLICER

TECHNICAL FIELD

The present invention relates to a fiber optic mechanical splicer. More particularly, the present invention relates to a fiber optic mechanical splicer, which can achieve an easy fiber splicing, allows an easy separation and reassembling, and does not allow an easy fiber disconnection.

BACKGROUND ART

In general, a single board fiber includes a core having a diameter of about 8 μm, a cladding part having an outer diameter of 125 μm, and a fiber coating part having an outer diameter of 250 μm, which protects the circumference of the cladding part. Further, the single board fiber and an outer coating part, which protects the single board fiber and has an outer diameter of 900 μm, constitute a single optical cable.

For fiber splicing of such an optical cable, the cladding part is exposed by removing a part of the outer coating part and then removing a part of the fiber coating part.

There are various fiber splicing methods, including a mechanical splicing method using a fiber optic mechanical splicer, which enables a fiber splicing without an apparatus requiring a separate power source on the working spot.

The fiber optic mechanical splicer is a device for fiber splicing connection, wherein two optical fibers are inserted in the fiber optic mechanical splicer, centers of the cores of the two optical fibers are aligned to each other, and the two optical fibers are then connected. In the conventional fiber optic mechanical splicer, the labor of fiber splicing connection may require a part made of a special material for constructing V-grooves for seating fibers therein and securing a clamping function providing a force necessary for maintenance of the alignment between fibers after the connection, or require a high-priced special tool since it is difficult for a user to optionally implement a function. As a result, this requirement may cause the production cost of the fiber optic mechanical splicer to increase.

Further, a method of interconnecting optical cables through mechanical compression thereof employs formation of a V-groove and the compression. However, it is very difficult to actually form a V-groove on plastic or metal.

Methods of forming a V-groove include various methods including a method of forming a V-groove by directly cutting out a panel made of plastic, ceramic, etc., a method of forming a V-groove by using a mold, etc. However, it is common and usually used that a V-groove is formed with an angle of 60 to 70 degrees and fibers are made to protrude 30 um~40 um from the end of the V-groove. However, it is very difficult to implement this method. That is, it is difficult to exactly achieve the angle and height, and an error of about 10 um may actually occur due to various reasons.

DISCLOSURE OF INVENTION

Technical Problem

Therefore, the present invention has been made in view of the above-mentioned problems, and an aspect of the present invention is to provide a fiber optic mechanical splicer, which can achieve a stable connection between optical fibers and overcome the difference and gap between cut surfaces of connected fibers by a matching gel, thereby achieving a smooth optical communication.

Solution to Problem

According to an aspect of the present invention, there is provided a fiber optic mechanical splicer including: a fiber connection base including a plurality of insertion parts, fiber connection parts, and auxiliary protuberances, the insertion parts being formed at lengthwise opposite sides of the fiber connection base, each of the insertion parts having an insertion hole through which an optical cable is inserted, the fiber connection parts being formed between and integrally with the insertion parts, the fiber connection parts having a connection groove formed at a central portion of the fiber connection parts and extending in a lengthwise direction of the fiber connection parts and insertion grooves formed at opposite ends of the connection groove, each of the insertion grooves being narrower in a downward direction, each of the auxiliary protuberance protruding upward from edges of the fiber connection parts; a base cover assembled with the fiber connection base while covering the fiber connection parts, the base cover being supported by the auxiliary protuberances; and one or more fastening clamps elastically fitted around the fiber connection base and the base cover through sliding in a state in which the fastening clamps are opposed to each other, the fastening clamps fixedly holding the fiber connection base and the base cover with each other while pressing the optical fiber seated in the connection groove.

Further, the fiber connection base includes: flat portions extending in a horizontal direction and in a lengthwise direction of the connection groove from opposite upper ends of the connection groove; and side walls extending upward from the flat portions, respectively, wherein matching gel is filled in a space defined by the flat portions and the side walls.

Further, the connection groove is a V-groove and an angle between slant surfaces of the connection groove has a value between 65 degrees and 90 degrees, and a protruding height, which corresponds to a height of a top of the optical fiber inserted and seated in the connection groove from the flat portion, has a value, which is larger than or equal to 0.02 mm and is smaller than or equal to 0.051 mm.

In addition, the auxiliary protuberance has a height equal to the protruding height.

Advantageous Effects of Invention

The present invention has the following effects.

First, the auxiliary protuberance allows an optical fiber to enter without scratching the base cover when the optical cable is inserted, thereby preventing the occurrence of a damage on the fiber.

Second, the recessed structure around the V-groove for defining a space for storage of a matching gel can maintain the matching gel in the space even after passage of time or in the case of reassembling of the fiber optic mechanical splicer for fiber reconnection, so as to compensate for the loss at the time of fiber connection and enable a stable optical cable connection.

Third, the present invention enables a selective changing of the angle between slant surfaces of the V-groove within degrees of 65 to 90 according to the working environment, which may become the most important issue in forming the V-groove for fiber clamping. As a result, the present invention can reduce the manufacturing cost and time.

Fourth, since the angle between slant surfaces of the connection groove has a value, which is larger than or equal to 65 degrees and smaller than or equal to 90 degrees, the protruding height of the optical fiber can have a value, which is larger than or equal to 0.02 mm and smaller than or equal to 0.051 mm. Therefore, it is possible to predict the height of the auxiliary protuberance.

BRIEF DESCRIPTION OF DRAWINGS

The foregoing and other objects, features and advantages of the present invention will become more apparent from the following detailed description when taken in conjunction with the accompanying drawings in which.

MODE FOR THE INVENTION

Figure 1:
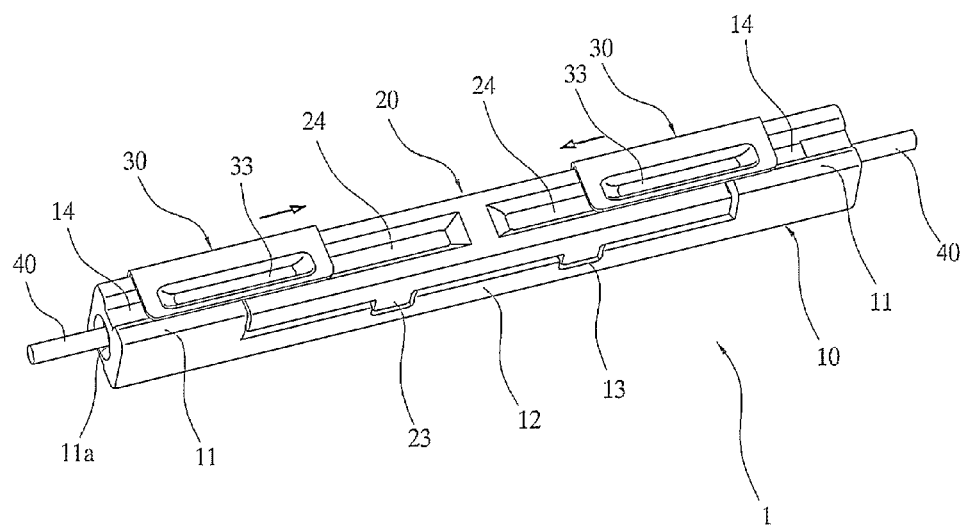
FIG. 1 is a perspective view of a fiber optic mechanical splicer according to an exemplary embodiment of the present invention.

FIG. 1 is a perspective view of a fiber optic mechanical splicer according to an exemplary embodiment of the present invention.

The fiber optic mechanical splicer 1 includes a fiber connection base 10 in which optical fibers 41 of optical cables 40 are aligned to each other, a base cover 20 covering the fiber connection base 10, and a fastening clamp 30 for assembling the fiber connection base 10 and the base cover 20 with each other.

The fiber connection base 10 has an elongated shape extending in the lengthwise direction and has insertion parts 11 integrally formed at both sides of the fiber connection base 10. Each of the insertion parts 11 has an insertion hole 11a through which an optical cable 40 is inserted.

The base cover 20 has assembling protuberances 23 protruding downward, which are engaged with assembling grooves 13 formed at the fiber connection base 10.

The base cover 20 has a clamp holding groove 24 formed on an upper surface of the base cover 20, wherein the clamp holding groove 24 extends in the lengthwise direction and is concave downward.

The fastening clamp 30 has a convex portion 33, which is engaged with the clamp holding groove 24 through sliding.

Figure 2:
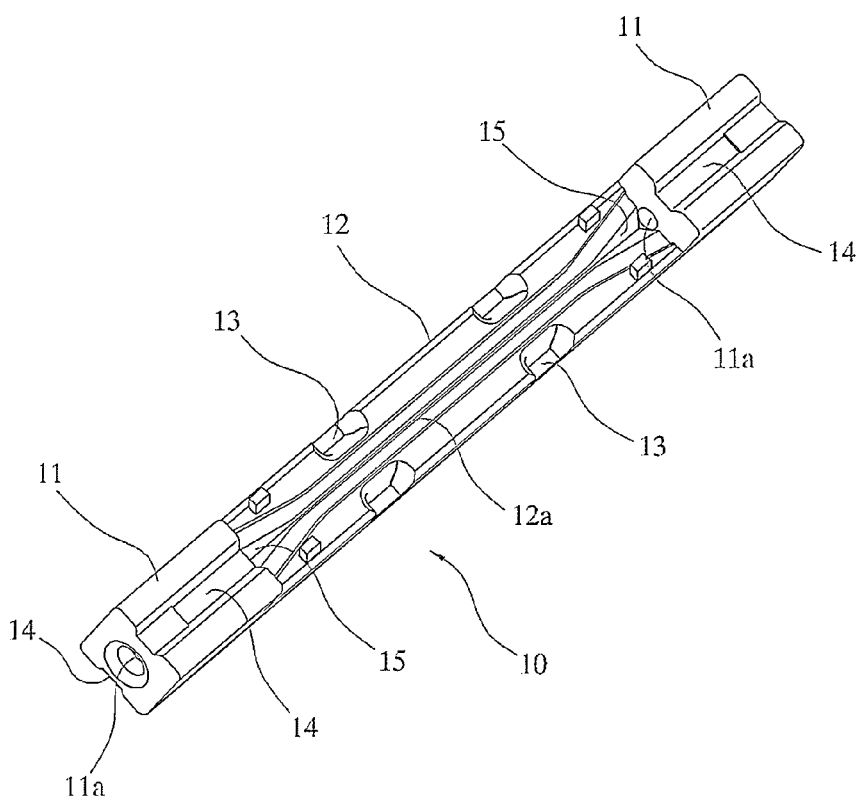
FIG. 2 is a perspective view of the fiber connection base according to an exemplary embodiment of the present invention.

FIG. 2 is a perspective view of the fiber connection base according to an exemplary embodiment of the present invention.

The insertion parts 11 are formed at opposite end parts of the fiber connection base 10, have the insertion holes 11a formed through the center of the insertion parts 11, in which the optical cable 40 is inserted, and determine the general shape of the fiber optic mechanical splicer 1.

The insertion part 11 has a square sectional shape and allows the base cover 20 to be assembled with the fiber connection base 10 within the range of the square sectional shape formed by the insertion part 11, thereby determining the general shape of the fiber optic mechanical splicer 1 as shown in FIG. 1.

The insertion part 11 may have a rectangular sectional shape or a circular sectional shape, instead of the square sectional shape.

The insertion part 11 has clamp holding grooves 14 formed by depressing the central portions of upper and lower surfaces of the insertion part 11.

The fiber connection base 10 has a V-shaped connection groove 12a formed at a central portion of the fiber connection base 10 and extending in the lengthwise direction of the fiber connection base 10. In the connection groove 12a, optical fibers 41 of two optical cables 40 inserted through the opposite insertion parts 11, actually the cores and cladding parts of the optical fibers 41, are seated and connected with each other.

Further, a plurality of assembling grooves 13 are formed along the lengthwise direction thereof at both edges of the fiber connection part 12.

In addition, clamp holding grooves 14 and 24 for assembling of the fastening clamps 30 are formed in the lengthwise direction on upper and lower surfaces of the fiber connection base 10, that is, on the upper surfaces of the insertion parts 11 and the lower surfaces of the insertion part 11 and the fiber connection part 12.

Figure 3:
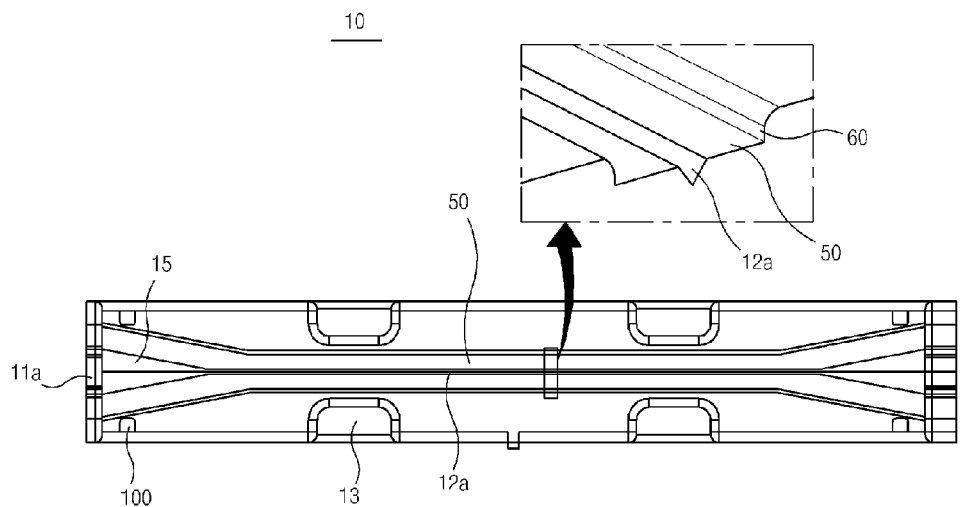
FIG. 3 is a front view of a fiber connection base according to an exemplary embodiment of the present invention.

FIG. 3 is a front view of a fiber connection base according to an exemplary embodiment of the present invention.

The connection groove 12a has a shape of the letter V and corresponds to a thin elongated groove extending in the lengthwise direction of the fiber connection base 10 at the central portion of the fiber connection base 10.

The fiber connection base 10 has flat portions 50 extending in the horizontal direction and in the lengthwise direction of the connection groove 12a from opposite upper ends of the connection groove 12a, and side walls 60 extending upward from the flat portions 50, respectively.

A matching gel G to be in contact with the optical fiber 41 is filled in the space defined by the flat portions 50 and the side walls 60.

A contact between optical fibers 41 may cause problems of axial disaccord between the optical fibers 41, angular disaccord, occurrence of a gap, or a rough end surface as shown in FIGS. 8A to 8D, which degrades the optical communication.

Figure 9:
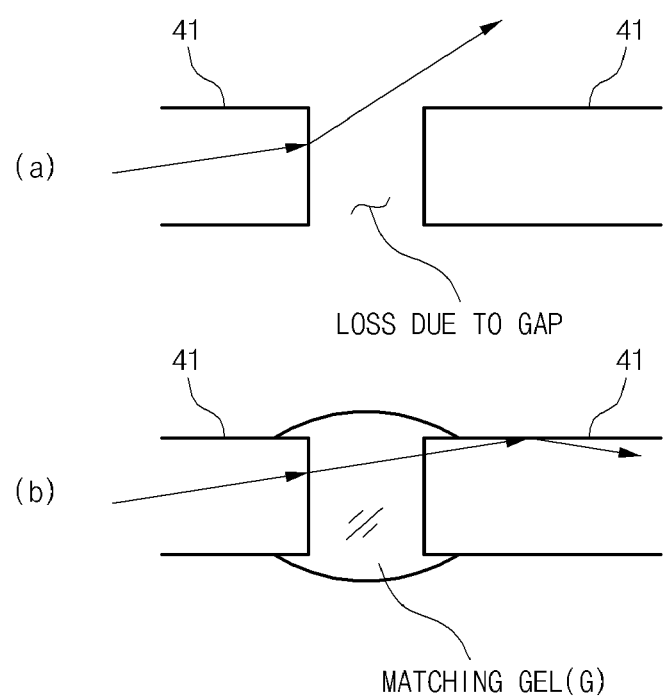
FIG. 9 shows a change of the optical path between before and after the matching gel G is filled in the space in the connection between fibers.

As shown in FIG. 9, the matching gel G is filled in the connection groove 12a also, so as to prevent the contact end surfaces of the optical fibers 41 from disaccording with each other at the time of connection between the optical fibers 41 in the connection groove 12a, thereby guaranteeing the smooth and harmonious communication.

The matching gel G is a viscous material and does not easily slide in the lengthwise direction of the fiber connection base 10 in the space defined by the flat portions 50 and the side walls 60, which prevents the matching gel G from being lost during reassembling of the fiber optic mechanical splicer 1.

Figure 4:
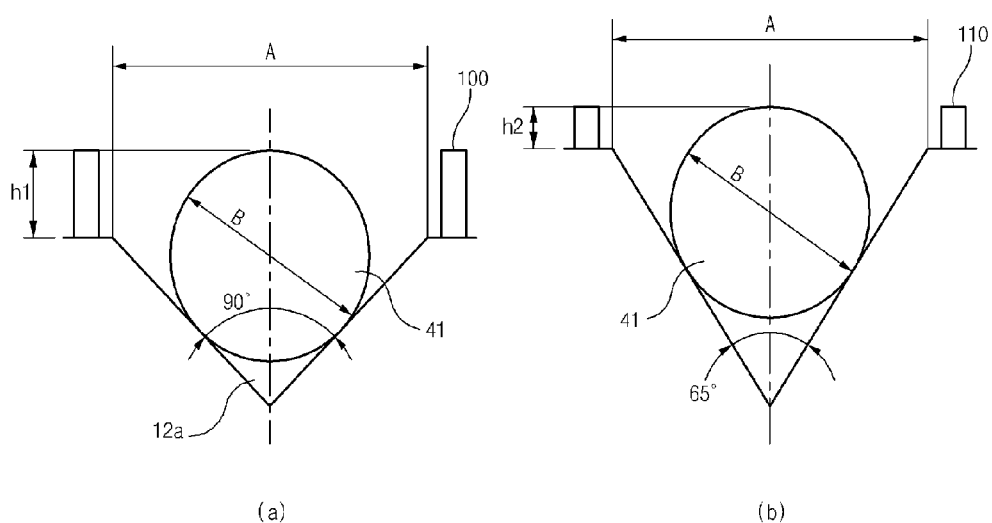
FIG. 4 is a sectional view showing the angle between the slant surfaces of the connection groove and the height of the auxiliary protuberance according to an exemplary embodiment of the present invention.

FIG. 4 is a sectional view showing the angle between the slant surfaces of the connection groove and the height of the auxiliary protuberance according to an exemplary embodiment of the present invention.

The angle between the slant surfaces of the connection groove 12a may have a value between 65 degrees and 90 degrees.

The protruding height h1 or h2 corresponds to a height of the top of an optical fiber inserted and seated in the connection groove 12a from the flat portion 50, and may have a value, which is larger than or equal to 0.02 mm and is smaller than or equal to 0.051 mm.

The auxiliary protuberance 100 is formed to have the same height as the protruding height h1 or h2 and the base cover 20 is supported by the auxiliary protuberance 100. As a result, the auxiliary protuberance 100 prevents the base cover 20 from scratching the optical fiber 41 when the optical fiber 41 is introduced into the connection groove 12a.

Figure 5:
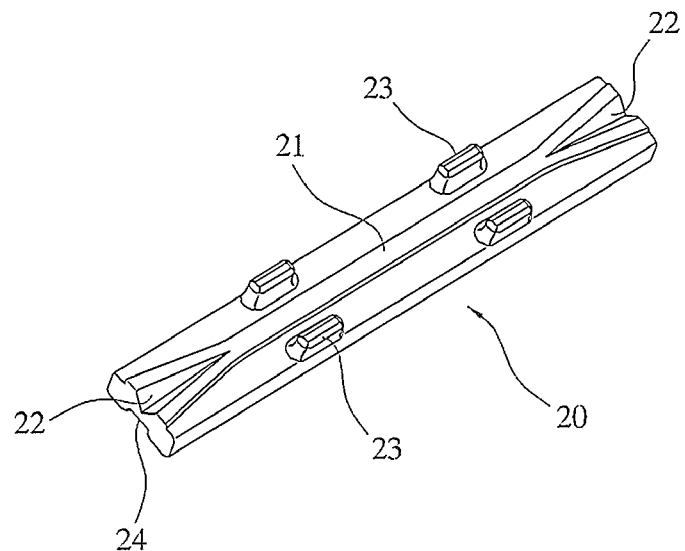
FIG. 5 is a perspective view of a base cover according to an exemplary embodiment of the present invention.

FIG. 5 is a perspective view of a base cover according to an exemplary embodiment of the present invention.

The base cover 20 is lengthily formed to have the same length as the length of the fiber connection part 12 and is assembled with the fiber connection base 10 to cover the fiber connection part 12. The base cover 20 has a plurality of assembling protuberances 23, which are formed at both side edges of the bottom surface of the base cover 20 and protrude downward.

When the base cover 20 is assembled with the fiber connection base 10, the assembling protuberances 23 are engaged with the assembling grooves 13, so as to prevent the base cover 20 from being separated rightward or leftward from the fiber connection base 10.

Further, clamp holding grooves 14 and 24 are formed on the upper surface of the base cover 20 and are adjacent to the clamp holding grooves 14 and 24 formed on the fiber connection base 10 when the base cover 20 has been assembled with the fiber connection base 10. Moreover, a fiber pressing part 21 is formed on a lower surface of the base cover 20 and at a position corresponding to the connection groove 12a of the fiber connection base 10, so as to press an optical fiber 41 seated in the connection groove 12a.

In the meantime, first insertion grooves 15 and second insertion grooves 22 are formed on a lower surface of the base cover 20 and a lower surface of the base cover 20 corresponding to the fiber connection parts 12, respectively.

The first insertion grooves 15 are formed at lengthwise opposite ends of the fiber connection part 12 and are located in front of the insertion holes 11a. The front side of the first insertion groove 15 is tapered toward the connection groove 12a.

The first insertion groove 15 guides the optical fiber 41, which is introduced toward the connection groove 12a through the insertion hole 11a from the front side of the insertion hole 11a, to the connection groove 12a in a safe manner.

The second insertion grooves 22 are formed at lengthwise opposite ends of the fiber pressing part 21 and guide, together with the first insertion grooves 15, the optical fiber 41 to the connection groove 12a in a safe manner.

When the base cover 20 has been assembled with the fiber connection base 10, the second insertion grooves 22 are located above and correspond to the first insertion grooves 15.

Figure 6:
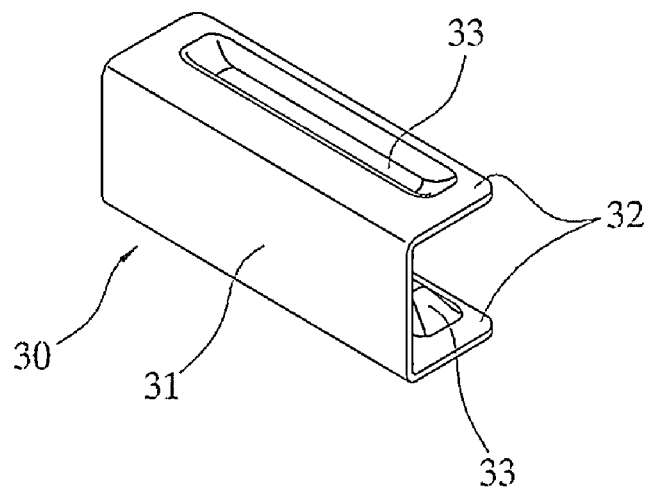
FIG. 6 is a perspective view of a fastening clamp according to an exemplary embodiment of the present invention.

FIG. 6 is a perspective view of a fastening clamp according to an exemplary embodiment of the present invention.

The fiber optic mechanical splicer 1 according to an exemplary embodiment of the present invention includes a first fastening clamp 30 and a second fastening clamp 30. Each fastening clamp 30 includes a vertical wall part 31 and horizontal plate parts 32 extending from the vertical wall part 31 and vertically opposed to each other, so that the fastening clamp 30 has a sectional shape like the Korean letter "ㄷ".

Each of the fastening clamps 30 is assembled with the fiber connection base 10 and the base cover 20 in the direction from the side surfaces of them, and the horizontal plate parts 32 of the fastening clamp 30 vertically opposed to each other then come into close contact with the upper and lower surfaces of the fiber connection base 10 and the base cover 20.

Convex portions 33 formed at inner portions of the horizontal plate parts 32 of the fastening clamp 30 are engaged with the clamp holding grooves 14 and 24, so as to press the base cover 20.

Hereinafter, an operation of the present invention will be described in detail with reference to the figures.

Figure 7:
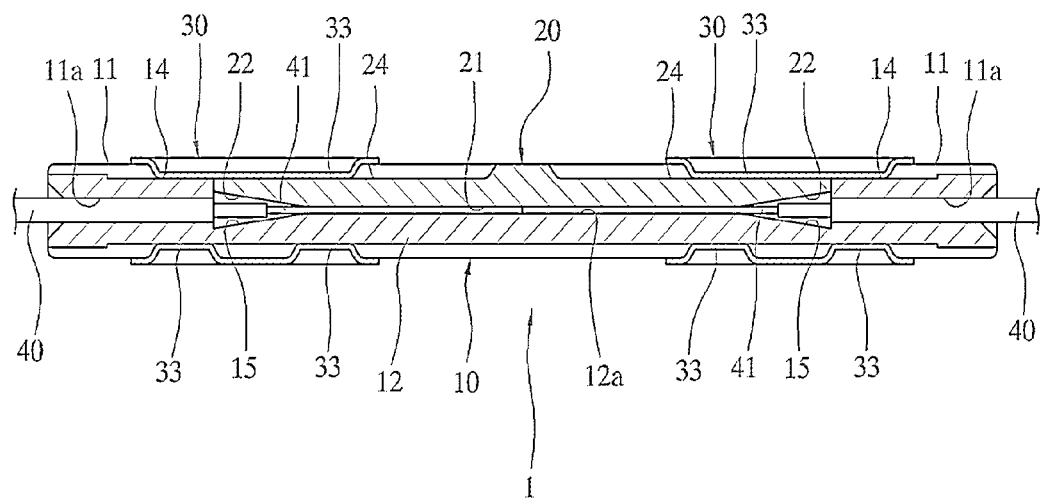
FIG. 7 is a sectional view of a fiber optic mechanical splicer according to an exemplary embodiment of the present invention.
Figure 8:
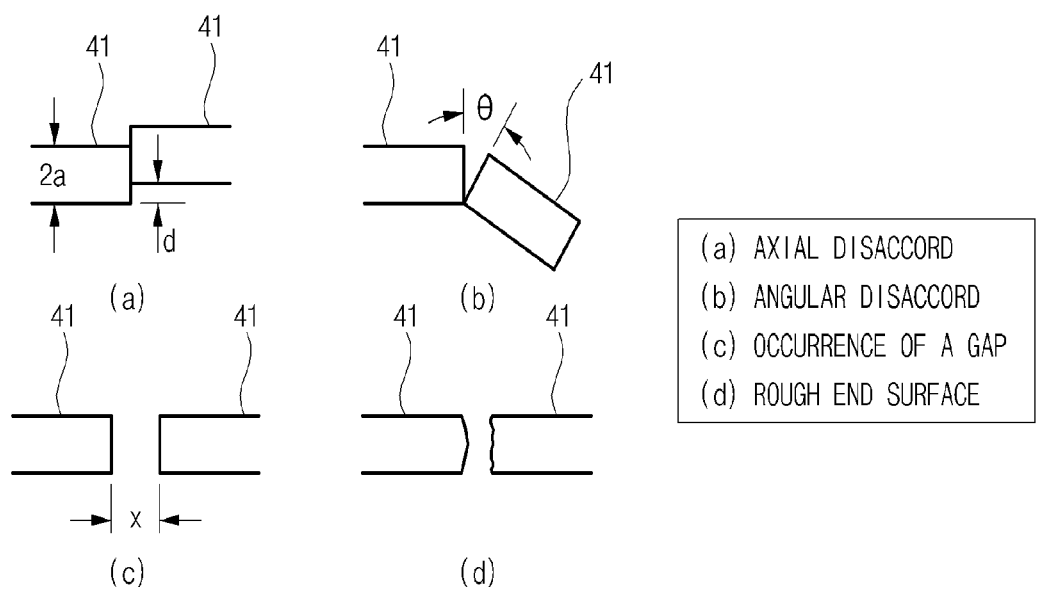
FIGS. 8A to 8D show examples of loss, which may occur during the connection between optical fibers.

FIG. 7 is a sectional view of a fiber optic mechanical splicer according to an exemplary embodiment of the present invention.

First, in a state in which the base cover 20 has been assembled with the fiber connection base 10 and the first insertion grooves 15 and the second insertion grooves 22 vertically correspond to each other, an optical cable 40 is inserted through the insertion hole 11a so that an optical fiber 41 is inserted into the fiber connection part 12.

At this time, since the base cover 20 is supported by the auxiliary protuberance 100 formed at the fiber connection base 10, the optical fiber 41 is safely guided into the connection groove 12a along the first insertion grooves 15 and the second insertion grooves 22 without a contact with the base cover 20 and is then seated in the connection groove 12a.

That is, at the time of the introduction of the optical fiber 41, even when the front end of the optical fiber 41 escapes from the central position, the front end of the optical fiber 41 is guided again toward the central position by the first insertion grooves 15 and the second insertion grooves 22, so that the optical fiber 41 can be seated in the connection groove 12a in an exact and safe manner.

Further, since the optical fiber 41 does not make a contact with the base cover 20, there is no damage on the optical fiber 41.

By sliding the first fastening clamp 30 and the second fastening clamp 30 in directions opposed to each other from both sides of the fiber connection base 10 and the base cover 20 as shown in FIG. 1, the fiber connection base 10 and the base cover 20 are tightly assembled with each other.

In more detail, ends of the horizontal plate parts 32 of the fastening clamps 30 are first aligned with the side ends of the fiber connection base 10 and the base cover 20, and the fastening clamps 30 are then forcibly pushed toward the fiber connection base 10 and the base cover 20, so that the fastening clamps 30 are fitted around the fiber connection base 10 and the base cover 20 to fasten them.

Then, the convex portions 33 formed at the horizontal plate parts 32 of the fastening clamps 30 are engaged with the clamp holding grooves 14 and 24 to press the upper surfaces of the base cover 20.

Since base cover 20 has elasticity, the base cover 20 can hold the optical fiber 41 through pressing of the optical fiber 41 by the convex portions 33 in spite of the fact that the base cover 20 is supported by the auxiliary protuberance 100.

That is, the fiber pressing part 21 corresponding to the optical fibers 41 presses the two connected optical fibers 41, thereby preventing the two connected optical fibers 41 from being easily separated from each other.

When the optical fibers 41 are connected to each other in the connection groove 12a, the matching gel G is filled in the space defined by the flat portions 50 and the side walls 60, so as to prevent the contact end surfaces of the two optical fibers 41 from disaccording with each other at the time of connection between the two optical fibers 41 in the connection groove 12a, thereby guaranteeing the smooth and harmonious communication.

Meanwhile, when it is necessary to disassemble the fiber optic mechanical splicer 1 for separation of the two connected optical fibers 41, the fastening clamps 30 are first separated.

That is, after holding the fiber optic mechanical splicer 1, the fastening clamps 30 are held and pulled outward. Then, the convex portions 33 slide along the clamp holding grooves 14 and 24, so that the fastening clamps 30 separated from the fiber connection base 10 and the base cover 20.

After the fastening clamps 30 are separated from the fiber connection base 10 and the base cover 20, the base cover 20 is separated from the fiber connection base 10 and the optical fibers 41 can be then disconnected from each other.

The matching gel G is a viscous material and does not easily slide in the lengthwise direction of the fiber connection base 10 in the space defined by the flat portions 50 and the side walls 60, which prevents the matching gel G from being lost during reassembling of the fiber optic mechanical splicer 1.

INDUSTRIAL APPLICABILITY

While this invention has been described in connection with what is presently considered to be the most practical and exemplary embodiment, it is to be understood that the invention is not limited to the disclosed embodiment and the drawings, but, on the contrary, it is intended to cover various modifications and variations within the spirit and scope of the appended claims.

The invention claimed is:

1. A fiber optic mechanical splicer comprising:
a fiber connection base including a plurality of insertion parts, fiber connection parts, and auxiliary protuberances, the insertion parts being formed at lengthwise opposite sides of the fiber connection base, each of the insertion parts having an insertion hole through which an optical cable is inserted, the fiber connection parts being formed between and integrally with the insertion parts, the fiber connection parts having a connection groove formed at a central portion of the fiber connection parts and extending in a lengthwise direction of the fiber connection parts and insertion grooves formed at opposite ends of the connection groove, each of the insertion grooves being narrower in a downward direction, each of the auxiliary protuberance protruding upward from edges of the fiber connection parts;
wherein the fiber connection base further includes flat portions extending in a horizontal direction and in a lengthwise direction of the connection groove from opposite upper ends of the connection groove; and side walls extending upward from the flat portions, respectively, wherein a matching gel is filled in a space defined by the flat portions and the side walls;
a base cover assembled with the fiber connection base while covering the fiber connection parts, the base cover being supported by the auxiliary protuberances; and
one or more fastening clamps elastically fitted around the fiber connection base and the base cover through sliding in a state in which the fastening clamps are opposed to each other, the fastening clamps fixedly holding the fiber connection base and the base cover with each other while pressing the optical fiber seated in the connection groove.

2. A fiber optic mechanical splicer comprising:
a fiber connection base including a plurality of insertion parts, fiber connection parts, and auxiliary protuberances, the insertion parts being formed at lengthwise opposite sides of the fiber connection base, each of the insertion parts having an insertion hole through which an optical cable is inserted, the fiber connection parts being formed between and integrally with the insertion parts, the fiber connection parts having a connection groove formed at a central portion of the fiber connection parts and extending in a lengthwise direction of the fiber connection parts and insertion grooves formed at opposite ends of the connection groove, each of the insertion grooves being narrower in a downward direction, each of the auxiliary protuberance protruding upward from edges of the fiber connection parts, wherein the connection groove is a V-groove and an angle between slant surfaces of the connection groove has a value between 65 degrees and 90 degrees, and a protruding height, which corresponds to a height of a top of the optical fiber inserted and seated in the connection groove from the flat portion, has a value, which is larger than or equal to 0.02 mm and is smaller than or equal to 0.051 mm;
a base cover assembled with the fiber connection base while covering the fiber connection parts, the base cover being supported by the auxiliary protuberances; and
one or more fastening clamps elastically fitted around the fiber connection base and the base cover through sliding in a state in which the fastening clamps are opposed to each other, the fastening clamps fixedly holding the fiber connection base and the base cover with each other while pressing the optical fiber seated in the connection groove.

3. The fiber optic mechanical splicer as claimed in claim 2, wherein the auxiliary protuberance has a height equal to the protruding height.

* * * * *